United States Patent
Sung (10) Patent No.: US 8,977,289 B2
(45) Date of Patent: Mar. 10, 2015

(54) METHOD OF PROCESSING POSITIONING INFORMATION AND ELECTRONIC APPARATUS AND COMPUTER-READABLE RECORDING MEDIUM

(71) Applicant: HTC Corporation, Taoyuan County (TW)

(72) Inventor: Yi-Ju Sung, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 57 days.

(21) Appl. No.: 13/746,319

(22) Filed: Jan. 22, 2013

(65) Prior Publication Data

US 2013/0210452 A1    Aug. 15, 2013

Related U.S. Application Data

(60) Provisional application No. 61/598,351, filed on Feb. 14, 2012.

(51) Int. Cl.
*H04W 24/00* (2009.01)
*H04W 52/02* (2009.01)
*G01S 19/34* (2010.01)
*G01S 19/48* (2010.01)
*G01S 19/28* (2010.01)

(52) U.S. Cl.
CPC .......... *H04W 52/0245* (2013.01); *H04W 24/00* (2013.01); *G01S 19/34* (2013.01); *G01S 19/48* (2013.01); *G01S 19/28* (2013.01)
USPC ...................................................... 455/456.1

(58) Field of Classification Search
USPC ...................... 455/456.1–457, 574
See application file for complete search history.

(56) References Cited

U.S. PATENT DOCUMENTS

| | | | |
|---|---|---|---|
| 7,570,208 B2 | 8/2009 | Wang et al. | |
| 8,050,686 B1 * | 11/2011 | Souissi et al. | 455/456.1 |
| 2004/0162086 A1 * | 8/2004 | Han | 455/456.1 |
| 2007/0264963 A1 * | 11/2007 | Srinivasan et al. | 455/343.2 |
| 2008/0207217 A1 * | 8/2008 | Ramanathan et al. | 455/456.1 |
| 2009/0061898 A1 * | 3/2009 | Johnson et al. | 455/456.2 |
| 2011/0205115 A1 | 8/2011 | Gronemeyer et al. | |
| 2011/0212732 A1 * | 9/2011 | Garrett et al. | 455/456.1 |
| 2011/0230203 A1 * | 9/2011 | Ihara et al. | 455/456.1 |
| 2012/0142368 A1 * | 6/2012 | Hjelm | 455/456.1 |
| 2012/0184292 A1 * | 7/2012 | Lin et al. | 455/456.1 |

FOREIGN PATENT DOCUMENTS

| | | |
|---|---|---|
| CN | 1315004 | 9/2001 |
| CN | 101210963 | 7/2008 |
| CN | 101634699 | 1/2010 |
| JP | 2012-18001 | 1/2012 |
| TW | I286899 | 9/2007 |

OTHER PUBLICATIONS

"First Office Action of China Counterpart Application", issued on Jun. 11, 2014, p. 1-p. 6, in which the listed references were cited.
"Office Action of Taiwan Counterpart Application", issued on Nov. 26, 2014, p.1-p.5.

* cited by examiner

*Primary Examiner* — Daniel Lai
(74) *Attorney, Agent, or Firm* — Jianq Chyun IP Office (57) ABSTRACT

A method of processing positioning information in an electronic apparatus having a signal receiving unit, is provided. The method includes receiving at least one positioning signal through the signal receiving unit and obtaining positioning information from the positioning signal. The method further includes selectively adjusting a positioning tolerance according to the positioning information and the positioning tolerance.

18 Claims, 5 Drawing Sheets

FIG. 6 ial application Ser. No. 61/598,351, filed on Feb. 14, 2012.
METHOD OF PROCESSING POSITIONING INFORMATION AND ELECTRONIC APPARATUS AND COMPUTER-READABLE RECORDING MEDIUM

CROSS-REFERENCE TO RELATED APPLICATION

This application claims the priority benefit of U.S. provisional application Ser. No. 61/598,351, filed on Feb. 14, 2012. The entirety of the above-mentioned patent application is hereby incorporated by reference herein and made a part of this specification.

BACKGROUND

1. Field of the Invention

The invention is directed to a method of processing positioning information, an electronic apparatus using the method and a computer-readable recording medium thereof.

2. Description of Related Art

A global positioning system (GPS) is a navigation system combining satellites and the wireless communication technique and capable of providing not only precise positioning but also related information such as speeds, times, directions, distances and so forth. In order improve daily life convenience for users, recently, the GPS is commonly built in mobile devices for the users to perform functions, such as current location positioning, direction guiding, route planning and so on.

However, for calculating positioning information (i.e. geographic information), a mobile device has to receive sufficient positioning signals from the satellites of the GPS (for example, the device has to at least identify locations relative to 4 satellites). Thus, when being about to perform positioning, the mobile device typically requires a period of time to identify the positioning signals received from the satellites. Further, the mobile device may not successfully receive the positioning signals sent from the satellites or the strength of the received positioning signals is not strong enough to identify the relative positions between the mobile device and the satellites due to the location where the mobile device is or weather conditions. As a result, when performing positioning, the mobile device consumes much power.

SUMMARY

The invention is directed to a method of processing positioning information, an electronic apparatus and a computer-readable recording medium, which are capable of reducing power consumption during reporting positioning information.

According to an exemplary embodiment of the invention, a method of processing positioning information for an electronic apparatus having a signal receiving unit is provided. The method includes receiving at least one positioning signal through the signal receiving unit and obtaining positioning information from the at least one positioning signal and according to the positioning information and a positioning tolerance, selectively adjusting the positioning tolerance.

According to an exemplary embodiment of the invention, an electronic apparatus including a signal receiving unit and a first positioning unit is provided. The first positioning unit is coupled to the signal receiving unit and configured to activate the signal receiving unit, receive at least one first positioning signal through the signal receiving unit and obtain positioning information from the at least one positioning signal and according to the positioning information and a positioning tolerance, selectively adjust the positioning tolerance.

According to an exemplary embodiment of the invention, a computer-readable recording medium storing a plurality of program codes is provided. After the plurality of program codes is loaded to a micro-processor, the plurality of program codes is executed by the micro-processor to: make a signal receiving unit of an electronic apparatus to receive at least one positioning signal; obtain positioning information from the at least one positioning signal and according to the positioning information and a positioning tolerance, selectively adjust the positioning tolerance.

To sum up, the method of processing positioning information, an electronic apparatus and a computer-readable recording medium may selectively adjust the positioning tolerance according to the positioning information and the positioning tolerance in the positioning signals, and if the deviation between the positioning information and the positioning tolerance is not less than the positioning tolerance, increase the positioning tolerance until the positioning tolerance is equal to the greatest positioning tolerance. Thus, power consumption during reporting positioning information can be effectively reduced.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1A:
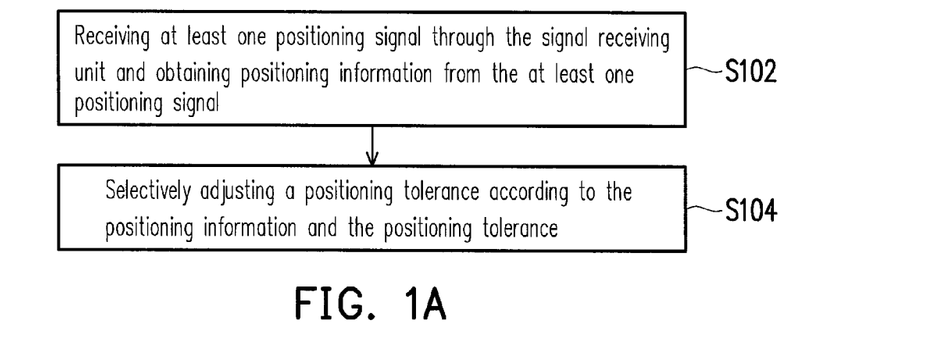
FIG. 1A is a flowchart illustrating a method of processing positioning information according to an exemplary embodiment of the invention.

Along with the increasing variety of positioning functions supported by a mobile device, if power consumption as required during a signal receiving unit receiving positioning signals may be saved, power consumption during reporting positioning information may be reduced. The invention provides a method of processing positioning information, and an electronic apparatus and a computer-readable recording medium thereof using the method according to the above point of view. FIG. 1A is a flowchart illustrating a method of processing positioning information according to an exemplary embodiment of the invention. The method of processing positioning information is applied on an electronic apparatus having a signal receiving unit. Referring to FIG. 1A, in step S102, the method includes receiving at least one positioning signal through the signal receiving unit and obtaining positioning information from the at least one positioning signal. Meanwhile, in step S104, the method includes selectively adjusting a positioning tolerance value according to the positioning information and the positioning tolerance value. In order to make the content of the present invention clearer, the following embodiments are illustrated as examples that can be truly implemented by the present invention.

Figure 1B:
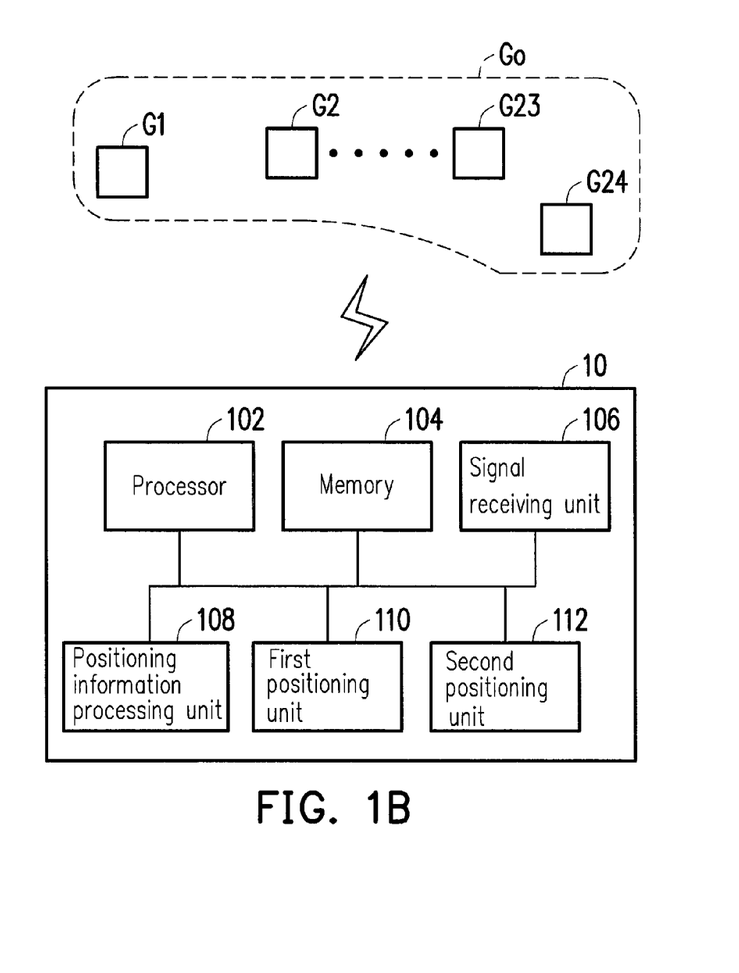
FIG. 1B is a schematic block diagram illustrating an electronic apparatus according to an exemplary embodiment of the invention.

FIG. 1B is a schematic block diagram illustrating an electronic apparatus according to an exemplary embodiment of the invention.

Referring to FIG. 1B, an electronic apparatus 10 includes a processor 102, a memory 104, a signal receiving unit 106, a positioning information processing unit 108, a first positioning unit 110 and a second positioning unit 112. The electronic apparatus 10 is, for example, a cell phone, a personal digital assistant (PDA), a smart phone, an electronic navigation device, a computer, a note book computer (NB), a tablet panel computer (PC), etc., which is not limited by the invention.

The processor 102 is a hardware (e.g. a chipset, a processor and set forth) having computing capability for controlling the entire operation of the electronic apparatus 10. In the present exemplary embodiment, the processor 102 is, for example, a central processing unit (CPU) or any other programmable microprocessor or digital signal processor (DSP), programmable controller, application specific integrated circuits (ASIC), programmable logic device (PLD) or the like.

The memory 104 is coupled to the processor 102. The memory 104 may be an internal storage unit or an external storage unit. The internal storage unit may be a random access memory (RAM), a read-only memory (ROM), a flash memory, or a magnetic disk storage device, etc. The external storage unit may be a compact flash (CF) memory card, a secure digital (SD) memory card, a micro SD memory card, or a memory stick (MS), etc. In the present exemplary embodiment, the memory 104 may store one or more programs or applications, operation systems (OS) for controlling the operation of the electronic apparatus 10. For example, the application may send a message of location request to obtain the positioning information.

The signal receiving unit 106 is coupled to the processor 102 and configured to positioning signal from a positioning system. For instance, the signal receiving unit 106 is a global positioning system (GPS) receiver for receiving a plurality of first positioning signals from a positioning system Go. In the present exemplary embodiment, the signal receiving unit 106 may be an independent chip or circuit composed of one or more logic gates. In addition, the positioning system Go of the present exemplary embodiment is, for example, a global positioning system (GPS), an assisted global positioning system (AGPS), a Galileo positioning system or a global navigation satellite system (GLONASS). In the present exemplary embodiment, the positioning system Go is a GPS and has a plurality of satellites G1~G24, and the first positioning signals are received by the signal receiving unit 106 from the satellites G1~G24, respectively. It is to be mentioned that in order to reduce the power provided to the signal receiving unit 106, after the signal receiving unit 106 is enabled for a predetermined work time, the signal receiving unit 106 of the present exemplary embodiment may enter a power-off mode or a power-saving mode, thereby stopping to receive the above-mentioned first positioning signals. Specifically, the electronic apparatus 10 may be selectively equipped with a timer (not shown), wherein a count value of the timer is configured to record the time when the signal receiving unit 106 receives the first positioning signals, and the signal receiving unit 106 may be activated or deactivated to enter the power-off mode or a power-saving mode. For example, it is assumed that the signal receiving unit 106 enters a power-off mode or a power-saving mode after the signal receiving unit 106 is enabled for P minutes (i.e., predetermined work time). Therefore, when the count value of the timer reaches P minutes, the signal receiving unit 106 stops to receive the first positioning signals from the satellites G1~G24. Further, for descriptive convenience, the positioning system Go having 24 satellites G1~G24 is exemplarily illustrated in FIG. 1B, but the amount of the satellites of the present exemplary embodiment is not limited thereto.

The positioning information processing unit 108 is coupled to the signal receiving unit 106. In the present exemplary embodiment, the positioning information processing unit 108 receives a location request message from an application and transmits the positioning information to the application in response to the location request message. For instance, when the application requesting for the positioning information is executed, the application sends a location request message to the positioning information processing unit 108 for requesting the current positioning information of the electronic apparatus 10, and the positioning information processing unit 108 returns the positioning information of the electronic apparatus 10 to the application.

The first positioning unit 110 is coupled to the signal receiving unit 106 and the positioning information processing unit 108. The first positioning unit 110 is configured to receive the first positioning signals from the positioning system Go through the signal receiving unit 106 and determines whether strength of the first positioning signals is greater than a strength threshold. Herein, the strength of the first positioning signals, for example, is a carrier to noise ratio of each of the satellites, which transmits the first positioning signals to the first positioning unit 110, in the positioning system Go. If the strength of the first positioning signals is not greater than the strength threshold, the first positioning unit 110 stops to sequentially receive the positioning signals by deactivating the signal receiving unit 106 or enabling the signal receiving unit 106 to enter the power-saving mode and after an adjustable interval time, re-activate the signal receiving unit 106. If the strength of the first positioning signals is greater than the strength threshold, the first positioning unit 110 receives a plurality of second positioning signals through the signal receiving unit 106. Additionally, the first positioning unit 110 generates positioning information according to the original first positioning signals or the received second positioning signals. The first positioning unit 110 calculates a deviation value corresponding to the positioning information and determines whether the deviation value is less than the positioning tolerance value. If the deviation value corresponding to positioning information is not less than the positioning tolerance value, the first positioning unit 110 increases the positioning tolerance value per a predetermined time until the positioning tolerance value is equal to a greatest positioning tolerance value.

In the present exemplary embodiment, the second positioning unit 112 is coupled to the signal receiving unit 106 and the positioning information processing unit 108 and configured to perform a second positioning procedure. In the second positioning procedure, the second positioning unit 112 activates the signal receiving unit 106 and continuously receives a plurality of third positioning signals through the signal receiving unit 106. The second positioning unit 112 generates positioning information according to the original first positioning signals, the original second positioning signals or the received third positioning signals. It should be mentioned that in another exemplary embodiment, the electronic apparatus 10 may not have to be equipped with the second positioning unit 112.

It should be understood that the positioning information processing unit 108, the first positioning unit 110 and the second positioning unit 112 may be implemented by program codes. For example, the positioning information processing unit 108, the first positioning unit 110 and the second positioning unit 112 are implemented on applications, operation systems, drivers or the like by program codes written by program languages. Such program codes are stored in the memory 104 and executed by the processor 102. In addition, in another exemplary embodiment of the invention, the positioning information processing unit 108, the first positioning unit 110 and the second positioning unit 112 are implemented by hardware circuits composed of one or more logic gates and controlled by the processor 102 to collectively perform the above-mentioned functions.

Besides, in the present exemplary embodiment, the electronic apparatus 10 may also be selectively equipped with a display (not shown), wherein the display provides a user interface, and the positioning information received by the application may be displayed on the user interface. The display is, for example, a liquid-crystal display (LCD), a plasma display, a vacuum fluorescent display, a light-emitting diode (LED) display, a field emission display (FED) and/or any other applicable type of display.

In order to enable technicians in the art to further understand the method for processing positioning information and the electronic apparatus using the method on the present exemplary embodiment, detailed description will be respectively made for the signal receiving unit 106, the positioning information processing unit 108, the first positioning unit 110 and the second positioning unit 112, hereinafter.

Figure 2:
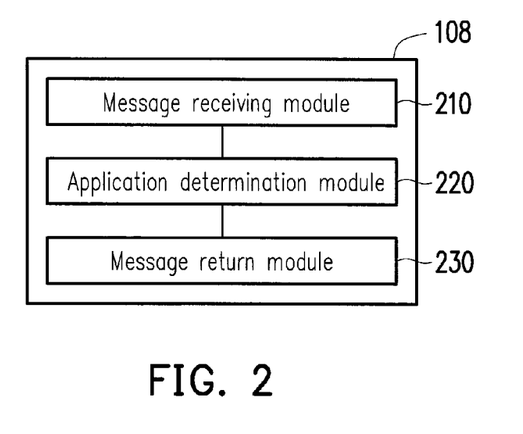
FIG. 2 is a schematic block diagram illustrating a positioning information processing unit according to an exemplary embodiment of the invention.

FIG. 2 is a schematic block diagram illustrating a positioning information processing unit 108 according to an exemplary embodiment of the invention.

Referring to FIG. 2, the positioning information processing unit 108 has a message receiving module 210, an application determination module 220 and a message return module 230. The message receiving module 210 is configured to receive the location request message sent by the application. The application determination module 220 is configured to identify whether the application sending the location request message is a location based services (LBS) application or any other non-LBS application (e.g. a satellite navigation application), which requires the positioning information. Herein, the non-LBS application determines the location of the electronic apparatus 10 through Global Satellite Positioning. And, the LBS application may also determine the location of the electronic apparatus 10 additionally through Global System for Mobile Communications (GSM), Code Division Multiple Access (CDMA) and so on. For example, an example, of the LBS application is Google Map. The message return module 230 is configured to transmit the requested positioning information to the application.

It should be mentioned that the non-LBS application (e.g. a satellite navigation application) needs more accurate positioning information, and therefore the positioning tolerance thereof is smaller. However, positioning information having lower accuracy may be applied in the non-LBS application, and therefore the positioning tolerance thereof is larger. Accordingly, in the present exemplary embodiment, when receiving a location request message from a LBS application, the positioning information processing unit 108 may reduce the power consumption of the electric apparatus 10 by adjusting the positioning tolerance for reporting positioning information.

Therefore, in the present exemplary embodiment, the application determination module 220 activates the first positioning unit 110 or the second positioning unit 112 to report positioning information with different mechanisms according to the above-mentioned determination result. Namely, if the application sending the location request message is an LBS application, the application determination module 220 activates the first positioning unit 110 to obtain the positioning information. However, if the application sending the location request message is not an LBS application, the application determination module 220 activates the second positioning unit 112 to obtain the positioning information.

For instance, the electronic apparatus 10 may be equipped with an application database for recording an application list belonging to the LBS application. The application list could be implemented by recording the application name. When the message receiving module 210 receives a location request message sent by an application, the application determination module 220 may determine whether the application belongs to the LBS application according to the application list.

Moreover, in another exemplary embodiment, the application determination module 220 may also determine whether the application belongs to the LBS application according to the location request message sent by the application. For example, the application determination module 220 may determine whether a parameter in the LBS application is matched according to a parameter (such as a frequency of the signal receiving unit 106 receiving the positioning signals) corresponding to the location request message. To be more specific, if the location request message sent by the application requests the positioning information processing unit 108 to return the positioning information per a time interval (i.e. requests the signal receiving unit 106 to receive the positioning signals less frequently), the positioning information processing unit 108 identifies that the application belongs to the LBS application. However, if the location request message sent by the application requests the positioning information processing unit 108 to continuously return the positioning information (i.e. requests the signal receiving unit 106 to receive the positioning signals more frequently), the positioning information processing unit 108 identifies that the application does not belong to the LBS application. As such, the application determination module 220 may perform the first positioning unit 110 or the second positioning unit 112 according to the application list and the location request message.

Figure 3A:
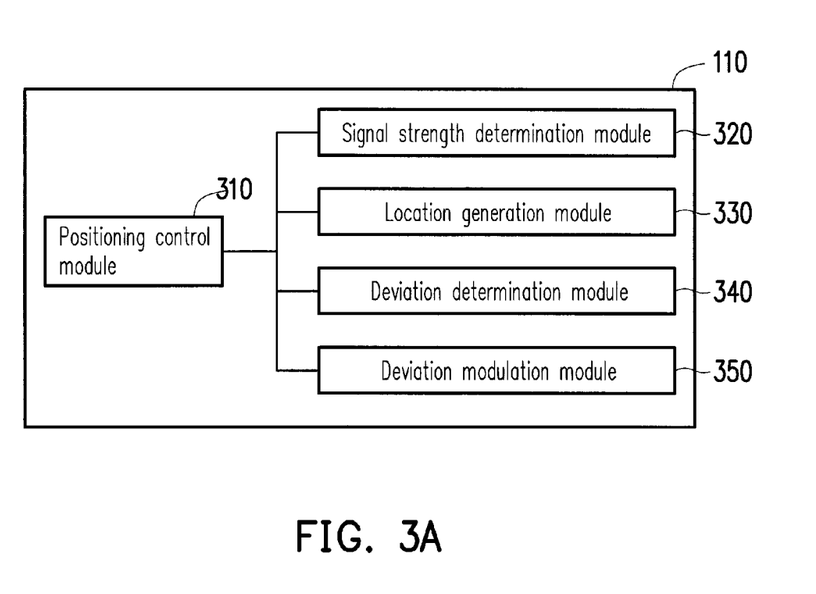
FIG. 3A is a schematic block diagram illustrating the first positioning unit according to an exemplary embodiment of the invention.

FIG. 3A is a schematic block diagram illustrating the first positioning unit 110 according to an exemplary embodiment of the invention.

Referring to FIG. 3A, the first positioning unit 110 includes a positioning control module 310, a signal strength determination module 320, a location generation module 330, a deviation determination module 340 and a deviation modulation module 350.

The positioning control module 310 is configured to activate the signal receiving unit 106 to receive a plurality of positioning signals (hereinafter as first positioning signals) from a positioning system. The signal strength determination module 320 is configured to determine whether the strength of the first positioning signals received by the signal receiving unit 106 is greater than a strength threshold.

Further, the signal strength determination module 320 calculate an average of the signal strength based on the first positioning signals received from the satellites G1~G24. For example, in the present exemplary embodiment, the signal strength determination module 320 selects 4 satellites from the satellites G1~G24, which have the stronger first positioning signals and calculate a strength average based on the first positioning signals received from the 4 satellites. However, it should be understood that the invention is not intent to limit the number of satellites for calculating the strength average. The signal strength determination module 320 determines whether the average is greater than the strength threshold. If the average is greater than the strength threshold, the signal strength determination module 320 identifies that the strength of the first positioning signals is greater than the strength threshold. Otherwise, if the average is not greater than the strength threshold, the signal strength determination module 320 identifies that the strength of the first positioning signals is not greater than the strength threshold. For example, in an exemplary embodiment, the strength threshold is set as 20. Here, the operation of receiving the positioning signals and determining whether the strength of the positioning signals is greater than the strength threshold is referred to as a signal strength verification step.

Particularly, if the strength of the first positioning signals is not greater than the strength threshold, the positioning control module 310 directly deactivates the signal receiving unit 106 and stops performing positioning to save power. Meanwhile, after an adjustable interval time, the positioning control module 310 re-activates the signal receiving unit 106 to receive positioning signals, and the signal strength determination module 320 re-determines whether the strength of the positioning signals received by the signal receiving unit 106 is greater than the strength threshold.

It is to be mentioned that the adjustable interval time represents an interval time for setting the positioning control module 310 to re-activate the signal receiving unit 106 upon a demand from a user. Or, the positioning control module 310 may also set the interval time for re-activating the signal receiving unit 106 according to the strength of the first positioning signals. For instance, if the signal strength determination module 320 determines that the current strength of the positioning signals is greater than the strength of the positioning signals obtained during the previous signal strength verification step, the positioning control module 310 shorten the interval time. Oppositely, if the signal strength determination module 320 determines that the current strength of the positioning signal is less than the strength of the positioning signals obtained during the previous signal strength verification step, the positioning control module 310 prolongs the interval time.

Figure 3B:
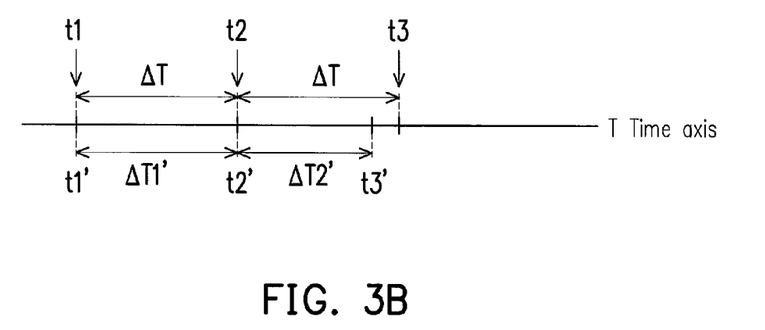
FIG. 3B is a schematic diagram illustrating the first positioning unit performing steps of signal strength verification according to an exemplary embodiment of the invention.

For example, FIG. 3B is a schematic diagram illustrating the first positioning unit performing steps of signal strength verification according to an exemplary embodiment of the invention.

Referring to FIG. 3B, on a time axis T of the first positioning unit 110 performing the signal strength verification step, it is assumed that the first positioning unit 110 performs the signal strength verification step per an interval time $\Delta T$ of 30 seconds. In this case, if the first positioning unit 110 identifies at a time point t1 (e.g. at the $0^{th}$ second) that the strength of the first positioning signals is not greater than the strength threshold, the first positioning unit 110 deactivates the signal receiving unit 106 so as to stop the signal receiving unit 106 to receive the first positioning signal from the satellites G1~G24. Meanwhile, at a time point t2 (e.g. at the $30^{th}$ second) after the same interval time $\Delta T$, the first positioning unit 110 performs again the signal strength verification step. Then, if first positioning unit 110 identifies at the time point t2 that the strength of the first positioning signals is not greater than the strength threshold, likewise, the first positioning unit 110 deactivates the signal receiving unit 106 and performs the signal strength verification step at a time point t3 after the same interval time $\Delta T$. Thus, when the strength of the first positioning signals is less than the strength threshold, the signal receiving unit 106 may be immediately deactivated to save the power consumption of the electronic apparatus 10.

In another exemplary embodiment, similarly as shown in FIG. 3B, on the time axis T of the first positioning unit 110 performing the signal strength verification step, it is assumed that the signal receiving unit 106 determines the interval time according to the strength of the first positioning signal received during the previous signal strength verification step. Here, if the first positioning unit 110 identifies at a time point t1' (e.g. at the $0^{th}$ second) that the strength of the first positioning signals is not greater than the strength threshold, the first positioning unit 110 deactivates the signal receiving unit 106 and performs the signal strength verification step at a time point t2' after an interval time $\Delta T1'$. Then, if the first positioning unit 110 identifies at the time point t2' (e.g. at the $30^{th}$ second) that the strength of the first positioning signals is not greater than the strength threshold, the first positioning unit 110 deactivates the signal receiving unit 106 and performs the signal strength verification step at a time point t3' (e.g. at the $50^{th}$ second) after an interval time $\Delta T2'$ (e.g. 20 seconds). Therein, it is assumed that the strength of first positioning signals received by the signal receiving unit 106 at the time point t2' is greater than the strength of first positioning signals received at the time point t1'. Accordingly, the interval time $\Delta T2'$ is less than the interval time $\Delta T1'$. Likewise, the power consumption of the electronic apparatus 10 may be effectively saved.

Returning to FIG. 3A, if the strength of the first positioning signals is greater than the strength threshold, the first positioning unit 110 performs a first positioning procedure. In the first positioning procedure, the location generation module 330 receives one or more second positioning signals through the signal receiving unit 106, and the location generation module 330 generates positioning information according to the received second positioning signal. Here, the second positioning signals may be identical to or different from the first positioning signals. Then, the deviation determination module 340 calculates a deviation corresponding to the positioning information and determines whether the deviation is less than a positioning tolerance. The positioning tolerance is, for example, a deviation of a distance within a location range from a precise positioning point. Furthermore, if the deviation determination module 340 determines that the deviation corresponding to the positioning information is less than the positioning tolerance, the positioning information processing unit 108 transmits the positioning information to the application in response to the location request message, and the positioning control module 310 deactivates the signal receiving unit 106.

On the other hand, if the deviation determination module 340 determines that the deviation corresponding to the positioning information is not less than the positioning tolerance, the deviation modulation module 350 increases the positioning tolerance at this time or per a predetermined time period (e.g. per 10 seconds) until the positioning tolerance is equal to a greatest positioning tolerance (e.g. a radius or a diameter of 600 meters). Namely, the signal receiving unit 106 further receives more second positioning signals, the location generation module 330 generates the positioning information according to the received second positioning signals, and the deviation determination module 340 calculates the deviation corresponding to the positioning information and determines whether the deviation corresponding to the positioning information is less than the positioning tolerance increased by the deviation modulation module 350. Here, the deviation modulation module 350 may obtain a positioning tolerance parameter from the application and set a greatest positioning tolerance, a predetermined time period and a ratio for increasing the positioning tolerance according to the positioning tolerance parameter. To be specific, under the condition where the deviation modulation module 350 gradually increases the positioning tolerance, if the deviation determination module 340 determines that the deviation corresponding to the positioning information is already less than the positioning tolerance, the positioning information processing unit 108 transmits the positioning information generated by the location generation module 330 to the application, and the positioning control module 310 deactivates the signal receiving unit 106 so as to speed up the transmission of the positioning information to the application in response to the location request message and save the power consumption of the electronic apparatus 10.

It is to be mentioned that the positioning control module 310 may further decide the time point to deactivate the signal receiving unit 106 by determining whether the count value of the timer (not shown) is equal to the predetermined work time. For instance, if the count value of the timer is equal to the predetermined work time of the signal receiving unit 106 and the deviation corresponding to the positioning information is still not less than the positioning tolerance, the positioning control module 310 deactivate the signal receiving unit 106 and re-activates the signal receiving unit 106 after the interval time as set.

Figure 3C:
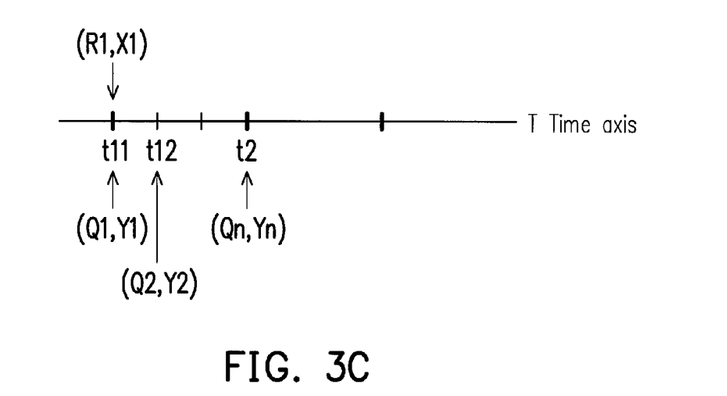
FIG. 3C a schematic diagram of generating positioning information according to an exemplary embodiment of the invention.

FIG. 3C a schematic diagram of generating positioning information according to an exemplary embodiment of the invention, wherein the signal receiving unit 106 is on the time axis T.

Referring to FIG. 3C, it is assumed that positioning information R1 generated by the location generation module 330 at a time point t11 has a deviation X1 of 50 meters, as shown in (R1, X1) and the positioning tolerance is 300 meters. Here, since the deviation X1 (i.e. 50 meters) is less than the positioning tolerance (i.e. 300 meters), the positioning information processing unit 108 transmits the positioning information R1 to the application in response to the location request message, and the positioning control module 310 deactivates the signal receiving unit 106.

However, in FIG. 3C, if positioning information Q1 generated by the location generation module 330 at the time point t11 has a deviation Y1 of 500 meters, as shown in (Q1, Y1) and the positioning tolerance is 300 meters. At this time, since the deviation Y1 (i.e. 500 meters) is not less than the positioning tolerance 1 (i.e. 300 meters), the deviation modulation module 350 increases the positioning tolerance up to 400 meters, for example. Here, the deviation Y1 corresponding to the positioning information Q1 is still greater than the positioning tolerance (i.e. 400 meters), and thus, the location generation module 330 generates another positioning information Q2 at a time point t12 after a predetermined time period (e.g. after 10 seconds). At this time, the deviation determination module 340 calculates the deviation Y2 corresponding to the positioning information Q2, as shown in (Q2, Y2) and determines whether the deviation Y2 is less than the positioning tolerance (i.e. 400 meters). Likewise, the location generation module 330 generates positioning information per a predetermined time period while the deviation modulation module 350 also increases the positioning tolerance until the positioning tolerance is equal to a greatest positioning tolerance (e.g. 600 meters).

On the other hand, if the count value of the signal receiving unit 106 receiving the first positioning signals which is recorded by timer is equal to the predetermined work time of the signal receiving unit 106 (e.g. at the time point t2) set by the first positioning unit 110, the deviation modulation module 350 already increases the positioning tolerance up to the greatest positioning tolerance, and a deviation Yn corresponding to positioning information Qn generated by the location generation module 330 at the time point t2 is still greater than the greatest positioning tolerance, the positioning information processing unit 108 will not transmit the positioning information Qn to the application, and the positioning control module 310 deactivates the signal receiving unit 106.

Figure 4:
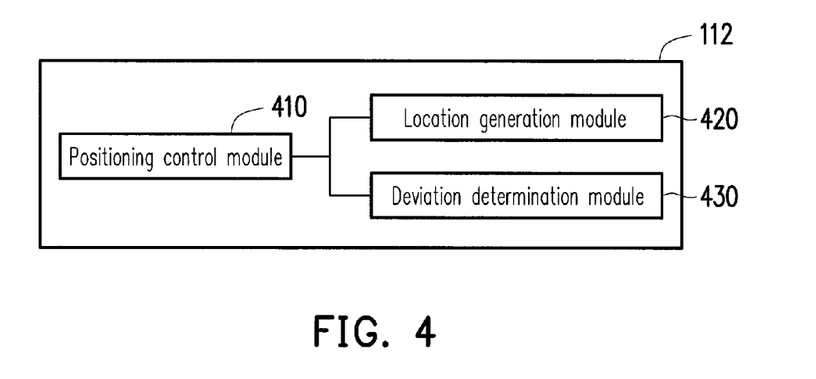
FIG. 4 is a schematic diagram illustrating a second positioning unit according to an exemplary embodiment of the invention.

FIG. 4 is a schematic diagram illustrating a second positioning unit according to an exemplary embodiment of the invention.

Referring to FIG. 4, the second positioning unit 112 includes a positioning control module 410, a location generation module 420 and a deviation determination module 430.

When a location request message is received from a non-LBS application (e.g. navigation application), the positioning information processing unit 108 instructs the second positioning unit 112 to perform a second positioning procedure. In detail, in the second positioning procedure, the positioning control module 410 activates the signal receiving unit 106 to continuously receive one or more third positioning signals through the signal receiving unit 106. Additionally, the location generation module 420 generates positioning information according to the third positioning signals. Meanwhile, when the deviation determination module 430 determines a deviation corresponding to the generated positioning information is less than a predetermined positioning tolerance, the positioning information processing unit 108 transmits the positioning information generated according to the third positioning signals by the location generation module 420 to the application.

It should be noticed that in the present exemplary embodiment, since the second positioning unit 112 does not deactivate the signal receiving unit 106 by the signal strength determination module determining whether strength of the third positioning signals is greater than the strength threshold, the location generation module 420 continues to generate the positioning information. Accordingly, the power consumed by the second positioning unit 112 obtaining the positioning information is greater than that consumed by the first positioning unit 110 obtaining the positioning information.

Figure 5:
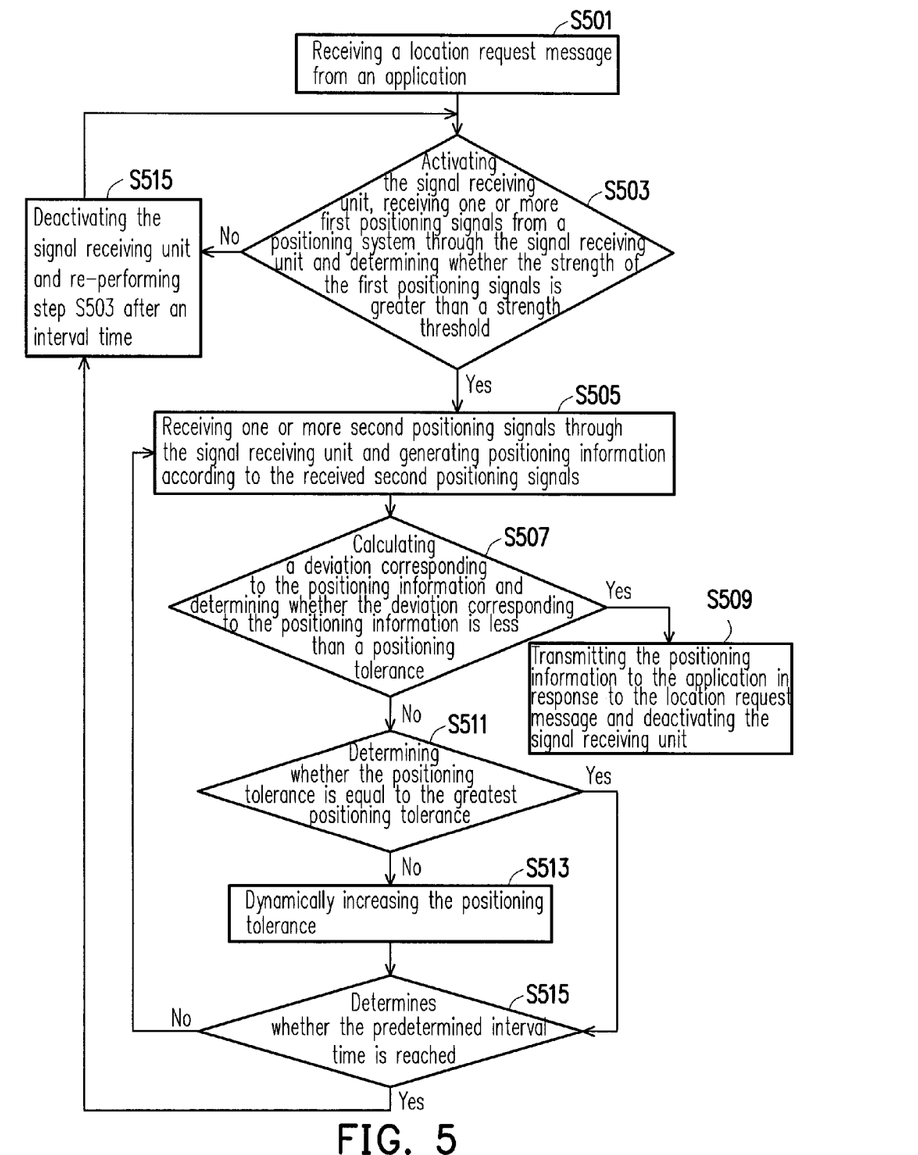
FIG. 5 is a flowchart illustrating a method of processing positioning information according to an exemplary embodiment of the invention.

FIG. 5 is a flowchart illustrating a method of processing positioning information according to an exemplary embodiment of the invention.

Referring to FIG. 5, in step S501, the positioning information processing unit 108 receives a location request message from an application. Then, in step S503, the first positioning unit 110 activates the signal receiving unit 106 to receive one or more first positioning signals through the signal receiving unit 106 from a positioning system and determines whether the strength of the first positioning signals is greater than a strength threshold.

If the strength of the received first positioning signals is not greater than the strength threshold, in step S515, the first positioning unit 110 deactivates the signal receiving unit 106 and re-performs step S503 after an interval time.

If the strength of the received first positioning signals is greater than the strength threshold, in step S505, the first positioning unit 110 receives one or more second positioning signals through the signal receiving unit 106 and generates positioning information according to the second positioning signal received by the signal receiving unit 106. Further, in step S507, the first positioning unit 110 calculates a deviation corresponding to the positioning information and determines whether the deviation corresponding to the positioning information is less than a positioning tolerance.

If the deviation corresponding to the positioning information is less than the positioning tolerance, in step S509, the positioning information processing unit 108 transmits the positioning information to the application in response to the location request message, and the first positioning unit 110 deactivates the signal receiving unit 106.

If the deviation corresponding to the positioning information is not less than the positioning tolerance, in step S511, the first positioning unit 110 determines whether the positioning tolerance is equal to the greatest positioning tolerance. If the positioning tolerance is not equal to the positioning tolerance, in step S513, the first positioning unit 110 dynamically increases the positioning tolerance. Specifically, as described above, the first positioning unit 110 increases the positioning tolerance per a predetermined time period.

Afterward, in step S515, the first positioning unit 110 determines whether the time to perform the first positioning procedure reaches the predetermined interval time (i.e., the predetermined work time). If the time to perform the first positioning procedure reaches the predetermined work time, the first positioning unit 110 deactivates the signal receiving unit 106, and step S503 is again performed after an interval time.

If the time to perform the first positioning procedure does not reach the predetermined interval time, step S505 is performed.

Figure 6:
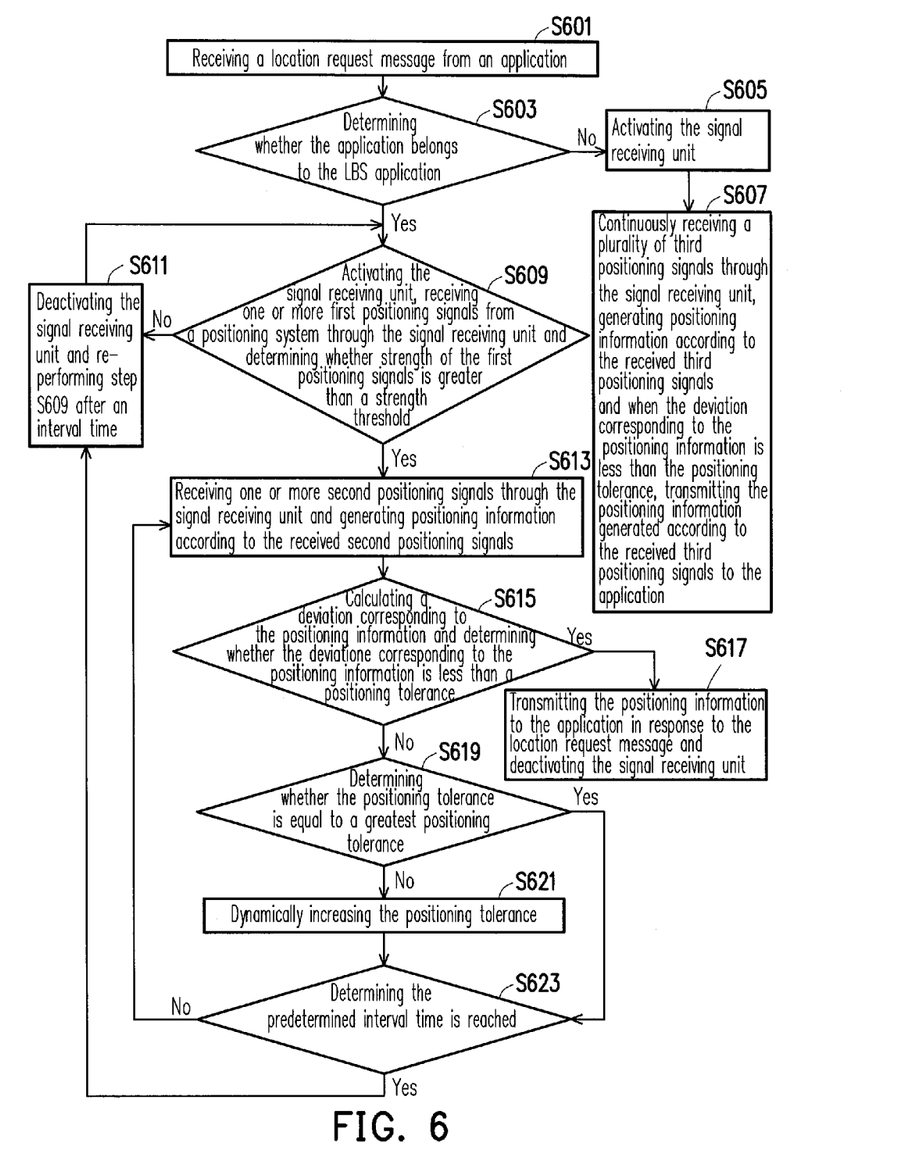
FIG. 6 is a flowchart illustrating a method of processing positioning information according to another exemplary embodiment of the invention.

FIG. 6 is a flowchart illustrating a method of processing positioning information according to another exemplary embodiment of the invention.

Referring to FIG. 6, in step S601, the positioning information processing unit 108 receives a location request message from an application. Then, in step S603, the positioning information processing unit 108 determines whether the application belongs to the LBS application. If the application does not belong to the LBS application, in step S605, the second positioning unit 112 activates the signal receiving unit 106. Then, in step S607, the second positioning unit 112 continuously receives a plurality of third positioning signals through the signal receiving unit 106. The location generation module 420 generates positioning information according to the third positioning signals received by the signal receiving unit 106. Meanwhile, when the deviation corresponding to the positioning information is less than the positioning tolerance, the positioning information processing unit 108 transmits the generated positioning information according to the received third positioning signals to the application.

If the application is determined as belonging to the LBS application, in step S609, the first positioning unit 110 activates the signal receiving unit 106 to receive a plurality of first positioning signals from a positioning system through the signal receiving unit 106 and determines whether strength of the first positioning signals is greater than a strength threshold.

If the strength of the received first positioning signals is not greater than the strength threshold, in step S611, the first positioning unit 110 deactivates the signal receiving unit 106 and re-performs step S609 after an interval time.

If the strength of the received first positioning signals is greater than the strength threshold, in step S613, the first positioning unit 110 receives a plurality of second positioning signals through the signal receiving unit 106 and generates positioning information according to the second positioning signals received by the signal receiving unit 106. Further, in step S615, the first positioning unit 110 calculates a deviation corresponding to the positioning information and determines whether the deviation corresponding to the positioning information is less than a positioning tolerance.

If the deviation corresponding to the positioning information is less than the positioning tolerance, in step S617, the positioning information processing unit 108 transmits the positioning information to the application in response to the location request message, and the first positioning unit 110 deactivates the signal receiving unit 106.

If the deviation corresponding to the positioning information is not less than the positioning tolerance, in step S619, the first positioning unit 110 determines whether the positioning tolerance is equal to a greatest positioning tolerance. If the positioning tolerance is not equal to the greatest positioning tolerance, in step S621, the first positioning unit 110 dynamically increases the positioning tolerance. Specifically, as described above, the first positioning unit 110 increases the positioning tolerance per a predetermined time period.

Afterward, in step S623, the first positioning unit 110 determines whether the time to execute the first positioning procedure reaches the predetermined interval time (i.e., the predetermined work time). If the time to execute the first positioning procedure reaches the predetermined work time, the first positioning unit 110 deactivates the signal receiving unit 106, and step S609 is again performed after the interval time.

If the time to execute the first positioning procedure does not reach the predetermined work time, step S613 is performed.

It is to be mentioned that according to another exemplary embodiment of the invention, a computer-readable recording medium is provided. The basic concept thereof is similar to what has been described in the above exemplary embodiments. The computer-readable recording medium may be any type of data storage element capable of storing data, which stores a plurality of program codes. When the program codes are loaded into a micro-processor, the micro-processor executes the programs codes to perform the steps of the method and the related operations as describe in the above exemplary embodiments.

Additionally, the computer-readable recording medium may include a read-only memory (ROM), a random-access memory (RAM), a CD-ROM, a tape, a floppy, an optical storage element, etc. The computer-readable recording mediums as mentioned above may be non-temporary and distributed in a computer system coupled to a network so as to store and execute the program codes in a distributed manner.

Based on the above, in the method of processing positioning information, the electronic apparatus and the computer-readable recording medium as discussed in the exemplary embodiments, during the signal strength verification step, if the strength of the first positioning signals is not greater than the strength threshold, the signal receiving unit is deactivated, and the signal strength verification step is performed after an interval time. If the strength of the first positioning signals is greater than the strength threshold, the first positioning procedure is performed, and the positioning information is generated according to the second positioning signals received by the signal receiving unit. If the deviation corresponding to the positioning information is less than the positioning tolerance, the positioning information is transmitted to the application in response to the location request message, and the signal receiving unit is deactivated. If the deviation corresponding to the positioning information is not less than the positioning tolerance, the first positioning procedure is repeated, and the positioning tolerance is increased per a predetermined time period until the positioning tolerance is equal to the greatest positioning tolerance. Accordingly, the signal receiving unit can be effectively controlled to receive the positioning signals from the positioning system so as to reduce the power consumption during reporting the positioning information.

Although the invention has been described with reference to the above exemplary embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method of processing positioning information in an electronic apparatus comprising a signal receiving unit, the method comprising:
    receiving at least one positioning signal through the signal receiving unit and obtaining positioning information from the at least one positioning signal; and
    selectively adjusting a positioning tolerance according to the positioning information and the positioning tolerance,
    wherein the step of selectively adjusting the positioning tolerance according to the positioning information and the positioning tolerance further comprises: when a deviation corresponding to the positioning information is not less than the positioning tolerance, increasing the positioning tolerance and re-performing the method of processing positioning information.

2. The method according to claim 1, further comprising: determining whether a strength of the positioning signal is greater than a strength threshold and stopping the signal receiving unit to sequentially receive the positioning signal when the strength of the positioning signal is not greater than the strength threshold.

3. The method according to claim 2, further comprising: setting the method of processing positioning information to be re-performed after an adjustable interval time according to the strength of the positioning signal.

4. The method according to claim 1, further comprising: obtaining a positioning tolerance parameter from an application; and
    setting a greatest positioning tolerance according to the positioning tolerance parameter.

5. The method according to claim 1, wherein the positioning information is applied on an application, and the application is a location-based service (LBS) application.

6. The method according to claim 5, further comprising: creating an application list to record at least one LBS application.

7. An electronic apparatus, comprising:
    a signal receiving unit; and
    a first positioning unit, coupled to the signal receiving unit and configured to activate the signal receiving unit, receive at least one positioning signal through the signal receiving unit and obtain positioning information from the at least one positioning signal and selectively adjust a positioning tolerance according to the positioning information and the positioning tolerance,
    wherein when a deviation corresponding to the positioning information is not less than the positioning tolerance, the first positioning unit increases the positioning tolerance.

8. The electronic apparatus according to claim 7, wherein the first positioning unit determines whether a strength of the at least one positioning signal is greater than a strength threshold and stop the signal receiving unit to sequentially receive the at least one positioning signal when the strength of the at least one positioning signal is not greater than the strength threshold.

9. The electronic apparatus according to claim 8, wherein the first positioning unit sets to re-activate the signal receiving unit after an adjustable interval time according to the strength of the positioning signal.

10. The electronic apparatus according to claim 7, wherein the first positioning unit obtains a positioning tolerance parameter from an application and set a greatest positioning tolerance according to the positioning tolerance parameter.

11. The electronic apparatus according to claim 7, wherein the positioning information is applied on an application, and the application is a LBS application.

12. The electronic apparatus according to claim 11, further comprising:
    a positioning information processing unit, configured to create an application list to record at least one LBS application.

13. A non-transitory computer-readable recording medium, storing a plurality of program codes, wherein when the plurality of program codes is loaded to a micro-processor, the plurality of program codes is executed by the micro-processor to:
    receive at least one positioning signal by a signal receiving unit of an electronic apparatus and obtain positioning information from the at least one positioning signal; and
    selectively adjust a positioning tolerance according to the positioning information and the positioning tolerance, and when a deviation corresponding to the positioning information is not less than the positioning tolerance, increase the positioning tolerance.

14. The non-transitory computer-readable recording medium according to claim 13, wherein the plurality of program codes is further executed by the micro-processor to:
    determine whether a strength of the positioning signal is greater than a strength threshold and stopping the signal receiving unit to sequentially receive the positioning signal when the strength of the positioning signal is not greater than the strength threshold.

15. The non-transitory computer-readable recording medium according to claim 13, wherein the plurality of program codes is further executed by the micro-processor to:
    set the signal receiving unit to be re-activated after an adjustable interval time according to the strength of the positioning signal.

16. The non-transitory computer-readable recording medium according to claim 13, wherein the plurality of program codes is further executed by the micro-processor to:
    obtain a positioning tolerance parameter from an application; and
    set a greatest positioning tolerance according to the positioning tolerance parameter.

17. The non-transitory computer-readable recording medium according to claim 13, wherein the positioning information is applied on an application, and the application is a LBS application.

18. The non-transitory computer-readable recording medium according to claim 13, wherein the plurality of program codes is further executed by the micro-processor to:
   create an application list to record at least one LBS application.

\* \* \* \* \*